(12) United States Patent
Pachikara et al.

(10) Patent No.: US 9,821,903 B2
(45) Date of Patent: Nov. 21, 2017

(54) CLOSED LOOP CONTROL OF AIRCRAFT CONTROL SURFACES

(71) Applicant: The Boeing Company, Chicago, IL (US)

(72) Inventors: Abraham J. Pachikara, Bothell, WA (US); Matthew A. Moser, Marysville, WA (US); Paul H. Carpenter, Renton, WA (US); Michael R. Finn, Kirkland, WA (US); Thomas S. Koch, Seattle, WA (US); Stefan R. Bieniawski, Seattle, WA (US); Brian T. Whitehead, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/330,824

(22) Filed: Jul. 14, 2014

(65) Prior Publication Data

US 2016/0229522 A1 Aug. 11, 2016

(51) Int. Cl.
*B64C 13/16* (2006.01)
*B64C 9/12* (2006.01)
(Continued)

(52) U.S. Cl.
CPC ............ *B64C 13/16* (2013.01); *B64C 3/44* (2013.01); *B64C 9/00* (2013.01); *B64C 9/12* (2013.01);
(Continued)

(58) Field of Classification Search
CPC ........... B64C 13/16; B64C 13/18; B64C 9/00; B64C 3/44; B64C 9/12; G06F 17/5095;
(Continued)

(56) References Cited

U.S. PATENT DOCUMENTS

| 2,350,751 A | 6/1944 | Gliubich |
| 3,822,047 A | 7/1974 | Schuldt, Jr. |

(Continued)

FOREIGN PATENT DOCUMENTS

| EP | 0193442 | 9/1986 |
| EP | 1547917 | 6/2005 |

(Continued)

OTHER PUBLICATIONS

Glenn Gilyard and Martín España, "On the Use of Controls for Subsonic Transport Performance Improvement: Overview and Future Directions," NASA Technical Memorandum 4605, NASA Office of Management, Scientific and Technical Information Program, Aug. 1994, 18 pages.

(Continued)

*Primary Examiner* — Valentina Xavier
(74) *Attorney, Agent, or Firm* — Hanley, Flight & Zimmerman, LLC

(57) ABSTRACT

Closed loop control of control surfaces is described herein. One disclosed example method includes measuring a flight metric of an aircraft during flight and calculating, using a processor, a deflection of a control surface of the aircraft based on the flight metric. The disclosed example method also includes adjusting the deflection to an effective deflection level based on the calculated deflection to reduce a drag coefficient of the aircraft.

28 Claims, 8 Drawing Sheets

(51) Int. Cl.
*G05D 1/08* (2006.01)
*B64C 3/44* (2006.01)
*B64C 9/00* (2006.01)
*B64D 45/00* (2006.01)

(52) U.S. Cl.
CPC ....... *B64D 45/0005* (2013.01); *G05D 1/0825* (2013.01); *Y02T 50/32* (2013.01); *Y02T 50/44* (2013.01)

(58) Field of Classification Search
CPC .. G05D 1/0825; B64D 45/0005; Y02T 50/44; Y02T 50/32
See application file for complete search history.

(56) References Cited

U.S. PATENT DOCUMENTS

| | | | |
|---|---|---|---|
| 4,029,271 A | 6/1977 | Murphy et al. | |
| 4,094,479 A | 6/1978 | Kennedy, Jr. | |
| 4,106,730 A | 8/1978 | Spitzer et al. | |
| 4,615,213 A | 10/1986 | Hagen | |
| 4,725,026 A | 2/1988 | Krafka et al. | |
| 4,729,528 A | 3/1988 | Borzachillo | |
| 4,821,981 A | 4/1989 | Gangsaas et al. | |
| 4,838,503 A | 6/1989 | Williams | |
| 4,899,284 A | 2/1990 | Lewis et al. | |
| 5,050,086 A | 9/1991 | Lambregts | |
| 5,056,741 A | 10/1991 | Bliesner et al. | |
| 5,170,969 A | 12/1992 | Lin | |
| 5,375,794 A | 12/1994 | Bleeg | |
| 5,442,958 A | 8/1995 | Hagen | |
| 5,596,332 A | 1/1997 | Coles et al. | |
| 5,669,582 A | 9/1997 | Bryant et al. | |
| 5,722,615 A | 3/1998 | Bilange et al. | |
| 5,838,239 A * | 11/1998 | Stern .............. | B64D 15/20 340/583 |
| 5,839,699 A | 11/1998 | Bliesner | |
| 5,908,176 A * | 6/1999 | Gilyard .......... | B64C 13/18 244/130 |
| 5,951,608 A | 9/1999 | Osder | |
| 6,152,405 A | 11/2000 | Muller | |
| 6,305,218 B1 | 10/2001 | Foster | |
| 6,330,483 B1 * | 12/2001 | Dailey ........... | G05B 5/01 318/561 |
| 6,531,967 B2 | 3/2003 | Djorup | |
| 6,553,333 B1 * | 4/2003 | Shenk ............ | B64F 5/60 701/3 |
| 6,563,452 B1 | 5/2003 | Zheng et al. | |
| 6,721,682 B1 * | 4/2004 | Moore ............ | G01M 9/08 244/194 |
| 6,785,610 B2 | 8/2004 | Baker et al. | |
| 6,845,303 B1 | 1/2005 | Byler | |
| 7,031,811 B2 | 4/2006 | Parsons et al. | |
| 7,228,227 B2 | 6/2007 | Speer | |
| 7,248,967 B2 | 7/2007 | Hagstedt | |
| 7,284,984 B1 * | 10/2007 | Zyskowski ..... | G09B 9/08 434/28 |
| 7,305,286 B1 | 12/2007 | Younkin et al. | |
| 7,379,839 B2 | 5/2008 | Cronin et al. | |
| 7,494,094 B2 | 2/2009 | Good et al. | |
| 7,539,561 B2 | 5/2009 | Nonami et al. | |
| 7,641,152 B2 | 1/2010 | Onu et al. | |
| 7,726,610 B2 | 6/2010 | Good et al. | |
| 8,086,362 B2 | 12/2011 | Dupre et al. | |
| 8,219,264 B1 | 7/2012 | Blake | |
| 8,219,266 B2 | 7/2012 | Puig et al. | |
| 8,255,101 B2 | 8/2012 | Virelizier et al. | |
| 8,356,766 B2 | 1/2013 | Garthaffner | |
| 8,376,284 B2 | 2/2013 | Lewis et al. | |
| 8,424,810 B1 | 4/2013 | Shmilovich et al. | |
| 8,437,887 B2 | 5/2013 | Coulmeau | |
| 8,447,443 B1 | 5/2013 | Ryan et al. | |
| 8,538,607 B2 | 9/2013 | Manfred et al. | |
| 8,788,122 B1 * | 7/2014 | Sankrithi ....... | B64C 23/065 244/158.1 |
| 8,949,090 B2 | 2/2015 | Whitehead et al. | |
| 9,193,440 B2 | 11/2015 | Moser et al. | |
| 2002/0089432 A1 | 7/2002 | Staggs et al. | |
| 2002/0171563 A1 | 11/2002 | Djorup | |
| 2003/0014165 A1 | 1/2003 | Baker et al. | |
| 2003/0222795 A1 | 12/2003 | Holforty et al. | |
| 2004/0070521 A1 | 4/2004 | Greene | |
| 2004/0111190 A1 * | 6/2004 | Van De Kreeke ...... | B64C 13/50 701/3 |
| 2005/0011994 A1 | 1/2005 | Sakurai et al. | |
| 2005/0114023 A1 | 5/2005 | Williamson et al. | |
| 2005/0116108 A1 * | 6/2005 | Morgenstern ......... | B64C 1/0009 244/130 |
| 2005/0151028 A1 | 7/2005 | Pohl et al. | |
| 2005/0171652 A1 | 8/2005 | Speer | |
| 2005/0230563 A1 | 10/2005 | Corcoran, III | |
| 2005/0242235 A1 * | 11/2005 | Delaplace ............ | G05D 1/0083 244/75.1 |
| 2005/0269456 A1 | 12/2005 | Saggio, III et al. | |
| 2006/0015247 A1 | 1/2006 | Speer | |
| 2006/0049308 A1 | 3/2006 | Good et al. | |
| 2006/0074558 A1 | 4/2006 | Williamson et al. | |
| 2006/0216674 A1 | 9/2006 | Baranov et al. | |
| 2006/0244637 A1 | 11/2006 | Baranov et al. | |
| 2007/0102565 A1 | 5/2007 | Speer et al. | |
| 2007/0103340 A1 | 5/2007 | Baranov et al. | |
| 2007/0136030 A1 | 6/2007 | Delaplace et al. | |
| 2008/0030375 A1 | 2/2008 | Cotton et al. | |
| 2008/0255713 A1 | 10/2008 | Onu et al. | |
| 2009/0302173 A1 | 12/2009 | Hanchey et al. | |
| 2010/0064766 A1 | 3/2010 | Nugent et al. | |
| 2010/0152926 A1 | 6/2010 | Onu et al. | |
| 2010/0200704 A1 | 8/2010 | Berens et al. | |
| 2010/0241294 A1 | 9/2010 | Virelizier et al. | |
| 2010/0252674 A1 | 10/2010 | Lang | |
| 2010/0283635 A1 | 11/2010 | Brinkman et al. | |
| 2011/0004361 A1 | 1/2011 | Goupil et al. | |
| 2011/0057830 A1 | 3/2011 | Sampigethaya et al. | |
| 2011/0062278 A1 | 3/2011 | Ulrich et al. | |
| 2011/0127385 A1 | 6/2011 | Morris | |
| 2011/0270473 A1 | 11/2011 | Reynolds et al. | |
| 2011/0282524 A1 | 11/2011 | Mutuel et al. | |
| 2012/0004844 A1 | 1/2012 | Sahasrabudhe et al. | |
| 2012/0032030 A1 | 2/2012 | Ruckes et al. | |
| 2012/0053916 A1 | 3/2012 | Tzidon | |
| 2012/0061506 A1 | 3/2012 | Gomez et al. | |
| 2012/0078540 A1 | 3/2012 | McIntyre | |
| 2012/0083946 A1 | 4/2012 | Maldonado et al. | |
| 2012/0150426 A1 | 6/2012 | Conway | |
| 2012/0286102 A1 | 11/2012 | Sinha et al. | |
| 2012/0325977 A1 | 12/2012 | Giesseler | |
| 2013/0226374 A1 | 8/2013 | Hagerott et al. | |
| 2013/0311011 A1 | 11/2013 | Malta | |
| 2013/0335243 A1 | 12/2013 | Smyth, IV et al. | |
| 2013/0338859 A1 * | 12/2013 | Yamasaki ............... | B64C 13/16 701/3 |
| 2013/0345910 A1 * | 12/2013 | Kerho ................... | B64D 43/02 701/14 |
| 2014/0214243 A1 | 7/2014 | Whitehead et al. | |
| 2014/0236399 A1 * | 8/2014 | Oudin ................. | G05D 1/0825 701/4 |
| 2015/0083852 A1 | 3/2015 | Moser et al. | |

FOREIGN PATENT DOCUMENTS

| | | |
|---|---|---|
| EP | 2465770 | 6/2012 |
| EP | 2974955 | 1/2016 |
| FR | 2902756 | 12/2007 |
| GB | 2186849 | 8/1987 |
| GB | 2444742 | 6/2008 |
| WO | WO9915403 | 4/1999 |

OTHER PUBLICATIONS

Glenn Gilyard, "Development of a Real-Time Transport Performance Optimization Methodology," NASA Technical Memoran-

(56) References Cited

OTHER PUBLICATIONS dum 4730, NASA Office of Management, Scientific and Technical Information Program, Jan. 1996, 18 pages.
Gilyard et al., "Flight Test of an Adaptive Configuration Optimization System for Transport Aircraft," NASA Dryden Flight Research Center, Jan. 1999, 17 pages.
Griffin et al., "Intelligent Control for Drag Reduction on the X-48B Vehicle," AIAA Guidance, Navigation, and Control Conference, Portland, Oregon, Aug. 8-11, 2011, 28 pages.
Canadian Intellectual Property Office, "Examiner's Report", issued in connection with Canadian Patent Application No. 2,887,795, issued on Apr. 22, 2016, 3 pages.
European Patent Office, "Extended European Search Report", issued in connection with European Patent Application No. 15170142.2, issued on Feb. 12, 2016, 9 pages.
Airbus, "Getting to Grips with Aircraft Performance," Jan. 2002, 216 pages.
Chichka, et al., "Peak-Seeking Control for Drag Reduction in Formation Flight", Journal of Guidance, Control, and Dynamics, vol. 29, No. 5, 2006, 13 pages.
Delta Virtual Airlines, "Boeing 777-200ER Aircraft Operating Manual", Nov. 2005, 28 pages.
European Patent Office, "European Search Report", issued in connection with Application No. EP14185998.3, issued Feb. 13, 2015, 2 pages.
Glenn Gilyard, "Development of a Real-Time Transport Performance Optimization Methodology", NASA Technical Memorandum 4730, NASA Office of Management, Scientific and Technical Information Program, Jan. 1996, 18 pages.
Gilyard, et al., "Flight Test of an Adaptive Configuration Optimization System for Transport Aircraft", NASA Dryden Flight Research Center, Jan. 1999, 17 pages.
Gilyard, et al., "On the Use of Controls for Subsonic Transport Performance Improvement: Overview and Future Directions", NASA Technical Memorandum 4605, NASA Office of Management, Scientific and Technical Information Program, Aug. 1994, 18 pages.
Griffin, et al., "Intelligent Control for Drag Reduction on the X-48B Vehicle", AIAA Guidance, Navigation, and Control Conference, Portland, Oregon, Aug. 8-11, 2011, 28 pages.
Viaziar Hemati, "Vortex-Based Aero-and Hydrodynamic Estimation", Ph.D. Dissertation, UCLA, 2013, 177 pages.
Hemati, et al., "Wake Sensing for Aircraft Formation Flight", AIAA Guidance, Navigation, and Control Conference, Aug. 13-16, 2012, Minneapolis, Minnesota, 12 pages.
Ray, et al., "Flight Test Techniques Used to Evaluate Performance Benefits During Formation Flight", NASA/TP-2002-210730, Aug. 2002, 25 pages.
The Boeing Company, "777 Flight Crew Operations Manual", Dec. 15, 2003, 46 pages.
United States Patent and Trademark Office, "Restriction Requirement", issued in connection with U.S. Appl. No. 13/752,119, dated Dec. 24, 2013, 7 pages.
United States Patent and Trademark Office, "Non-Final Office Action", issued in connection with U.S. Appl. No. 13/752,119, dated Mar. 14, 2014, 23 pages.
United States Patent and Trademark Office, "Notice of Allowability", issued in connection with U.S. Appl. No. 14/034,940, dated Oct. 23, 2015, 4 pages.
United States Patent and Trademark Office, "Notice of Allowance", issued in connection with U.S. Appl. No. 13/752,119, dated Sep. 18, 2014, 8 pages.
United States Patent and Trademark Office, "Non-Final Office Action", issued in connection with U.S. Appl. No. 14/034,940, dated Jun. 4, 2015, 9 pages.
Vachon, et al., "F/A-18 Performance Benefits Measured During the Autonomous Formation Flight Project", NASA/TM-2003-210734, Sep. 2003, 36 pages.
Sriram Venkataramanan, Abstract of "Dynamics and Control of Multiple UAVs Flying in Close Proximity", Master's Thesis, University of Texas at Austin, Aug. 2004, 1 page.
United States Patent and Trademark Office, "Notice of Allowance", issued in connection with U.S. Appl. No. 14/034,940, dated Sep. 30, 2015, 22 pages.
Canadian Intellectual Property Office, "Examiner's Report", issued in connection with Canadian Patent Application No. 2,887,795, issued on Feb. 15, 2017, 4 pages.

\* cited by examiner

CLOSED LOOP CONTROL OF AIRCRAFT CONTROL SURFACES

FIELD OF THE DISCLOSURE

This patent relates generally to aircraft and, more particularly, to closed loop control of aircraft control surfaces.

BACKGROUND

Some aircraft employ a variable camber approach to tailor the shape of an airfoil such as, for example, a trailing edge or other control surface of an aircraft wing. Tailoring the shape of the airfoil allows adjustment of lift characteristics during takeoff. Additionally, the position (e.g., deflection, angle, etc.) of the airfoil may affect drag during cruising speeds. Systems that adjust the airfoil during cruise to lower drag usually rely on a table (e.g., a table look-up) of tabulated reference aircraft data to adjust the airfoil during flight. However, such tables do not usually take into account factors that influence the instantaneous performance of the aircraft such as aircraft-to-aircraft variability, systematic variations, random disturbances, etc.

SUMMARY

An example method includes measuring a flight metric of an aircraft during flight and calculating, using a processor, a deflection of a control surface of the aircraft based on the flight metric. The example method also includes adjusting the deflection based on the calculated deflection to reduce a drag coefficient of the aircraft.

Another example method includes measuring a flight metric of an aircraft, adjusting a control surface of the aircraft to a first angle, remeasuring the metric and calculating, using a processor, a second angle of the control surface based on one or more of a flight condition, the measured flight metric, or the re-measured flight metric to reduce drag of the aircraft. The example method also includes adjusting the control surface to the second angle.

Another example method includes adjusting an aircraft control surface to a first angle, measuring a flight metric after the aircraft reaches steady state, calculating, using a processor, a second angle of the aircraft control surface based on the measured flight metric to reduce a drag coefficient of the aircraft and adjusting the aircraft control surface to the second angle.

Figure 1:
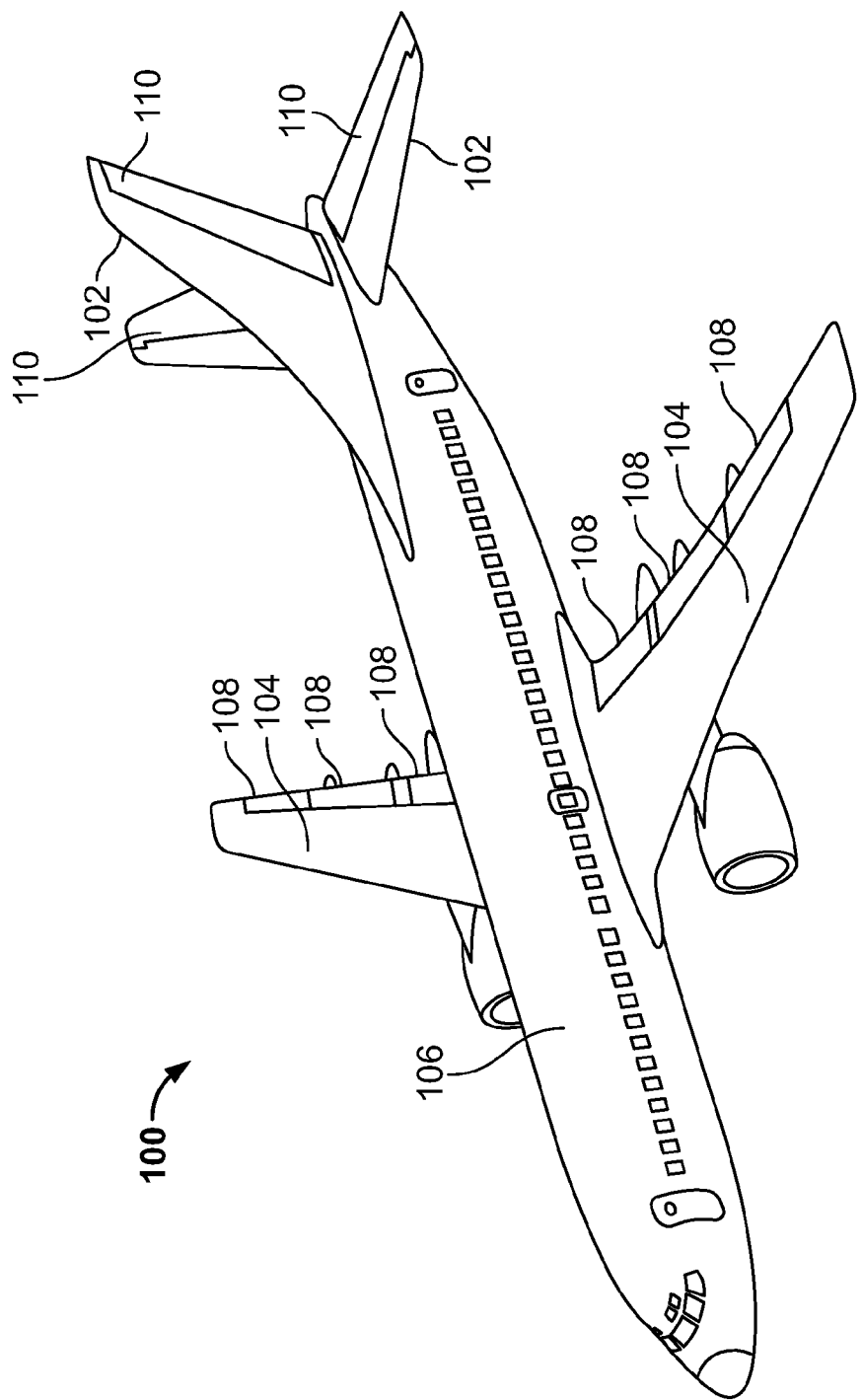
FIG. 1 illustrates an example aircraft that may be used to implement example methods and apparatus disclosed herein.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Closed loop control of control surfaces (e.g., flaps, rudders, ailerons, etc.) of an aircraft are disclosed herein. During takeoff, the control surfaces may work to provide the appropriate flight dynamics to allow or facilitate the aircraft taking off from a runway or landing. During cruise and/or takeoff of the aircraft, the positions, angles, or deflections of one or more control surfaces may impact the overall drag coefficient of the aircraft. Multiple control surfaces pose a multi-dimensional problem to be solved via which the drag coefficient may be reduced (e.g., minimized and/or optimized). Drag coefficient reduction can improve fuel economy of the aircraft and, therefore, reduce fuel costs and carbon-dioxide ($CO_2$) emissions. The examples disclosed herein allow continuous optimization of the positions of the control surfaces and/or allow optimization of the positions of the control surfaces based on unique and/or up-to-date or current conditions of the aircraft (e.g., weight reduction due to fuel consumption, etc.).

The examples disclosed herein may be used to reduce drag coefficient of an aircraft during flight through adjustment of one or more control surfaces of the aircraft. The examples disclosed herein provide current metric data to an estimation and optimization algorithm having an extended Kalman filter to adjust the positions of one or more control surfaces to reduce (e.g., minimize) the overall drag of the aircraft. The estimation and optimization algorithm of the disclosed examples may be used in conjunction with a search pattern lookup and provide uncertainty scaling to determine a perturbation deflection (e.g., perturbation, incremental deflection, etc.) to be combined with an estimated calculated delta resulting in a resultant deflection. In some examples, the estimated calculated delta is a change in control surface deflection calculated to provide the lowest overall drag of the aircraft. This calculated control surface delta may be provided to the control system to cause the control surface to displace (e.g., deflect) by the defined control surface delta. In some examples, the control surfaces are incrementally deflected (e.g., perturbed) to provide the resultant deflection described above. In other words, the control surfaces and/or the calculated delta are perturbed to gather data that may be used to characterize the drag coefficient of the aircraft as a function of control surface position(s).

In some examples, table lookup data, which may be generated through tabulated reference data gathered through numerous aircraft and/or calculations, is used by the estimation and optimization algorithm to continuously estimate the calculated delta for the aircraft control surface. In some examples, the table lookup data is modified based on the estimation and optimization algorithm. In particular, estimates provided by the table are updated by measurements taken during flight of the aircraft. In some examples, the degree to which the table lookup data is applied varies. In some examples, the metric is drag coefficient or thrust. In some examples, the control surfaces are only adjusted for a specified time after cruise speed has been reached. In some examples, the degree to which the control surface is deflected may vary based on behavior of the metric. In some examples, multiple control surfaces are independently adjusted.

As used in the examples disclosed herein, metric data (e.g., flight metric data, flight metric(s), etc.) describes data (e.g., values, table value, etc.) that may be measured and/or calculated from measured data at one or more sensors, for example. Metric data may be measured and calculated at numerous sensors and/or processor(s) and may include, but is not limited to, drag coefficient, thrust, fuel consumption, cruise performance and/or cruise range, etc.

FIG. 1 illustrates an example aircraft 100 having stabilizers 102 and wings 104 attached to a fuselage 106 in which the examples disclosed herein may be implemented. The wings 104 of the illustrated example have control surfaces (e.g., flaps, ailerons, tabs, etc.) 108, which are located at a trailing edge of the wings 104 and may be displaced or adjusted (e.g., angled, etc.) to provide lift during takeoff, for example. In some examples, the control surfaces 108 are operated (i.e., displaced) independently of one another. The examples described herein may be applied to control surfaces associated with any of the stabilizers 102, the wings 104 and/or any other exterior or outboard structure (e.g., a horizontal stabilizer, a wing strut, an engine strut, a canard stabilizer, etc.) of the fuselage 106. In particular, the wings 104 and/or the stabilizers 102 may have control surfaces 110 that can be adjusted to reduce (e.g., minimize) the value of a metric such as drag coefficient, $c_d$, during cruise, for example. Additionally or alternatively, in some examples, the fuselage 106 has control surfaces, which may be deflected, to alter the flight characteristics during cruise and/or takeoff of the aircraft 100.

Figure 2:
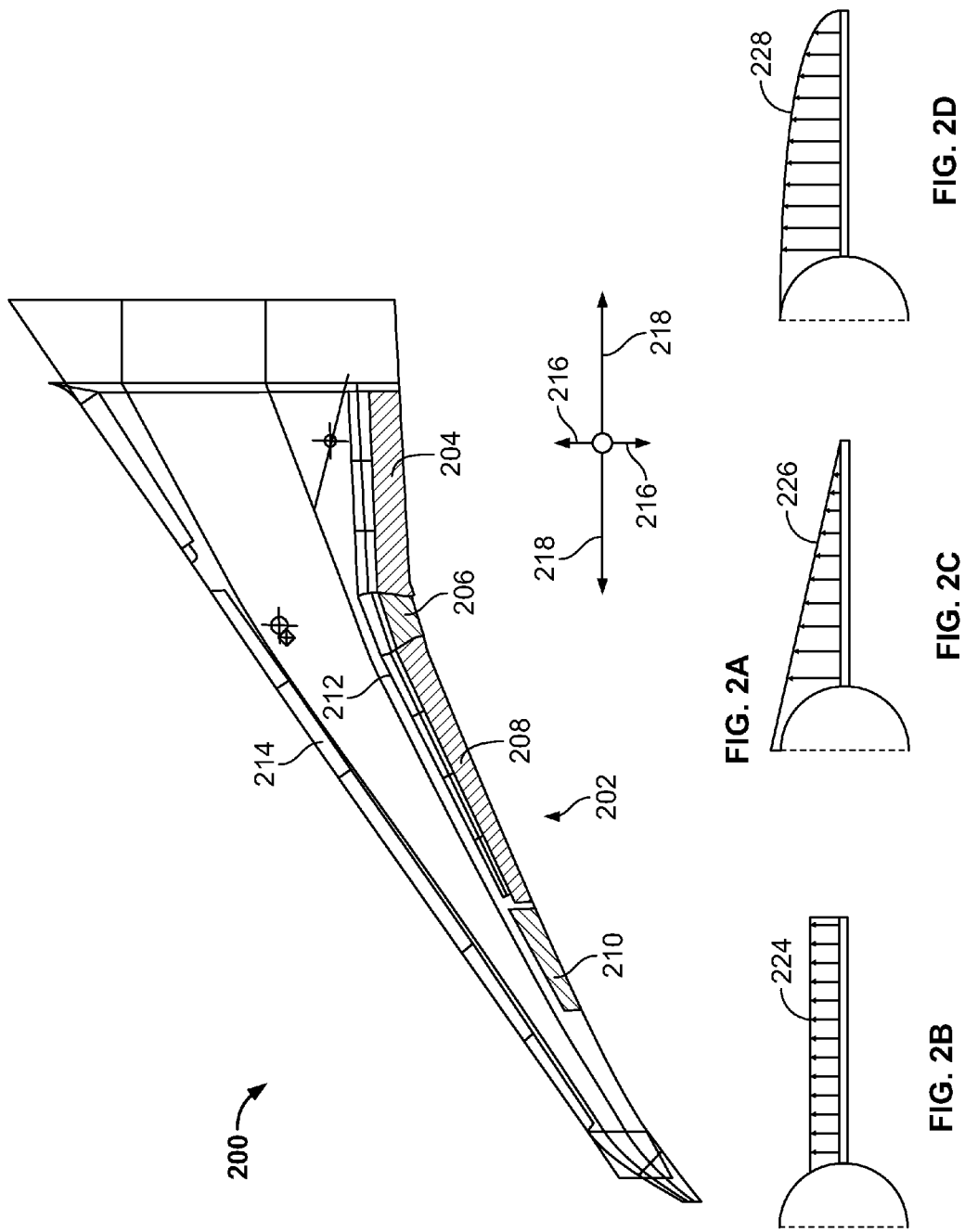
FIG. 2A illustrates an example wing structure in which the examples disclosed herein can be implemented.
FIGS. 2B-2D illustrate load distributions that are achievable through movement of the control surfaces.

FIG. 2A illustrates an example wing structure 200 of an aircraft (e.g., the aircraft 100 of FIG. 1) in which the examples disclosed herein can be implemented. The example wing structure 200 has control surfaces (e.g., trailing edge surfaces defining a wing camber) 202 including an inboard flap 204, a flaperon 206, an outboard flap 208 and an inboard aileron 210. Additionally or alternatively, in some examples, the control surfaces 202 include leading edge surfaces such as spoilers 212 and/or slats 214. The inboard flap 204 and the outboard flap 208 of the illustrated example alter the lift and drag of the aircraft. The flaperon 206 and the inboard aileron 210 of the illustrated example alter the roll of the aircraft. The spoilers 212 of the illustrated example alter the lift, drag and roll of the aircraft. In this example, the slats 214 alter the lift of the aircraft. The control surfaces 202 of the illustrated example also play a role in determining the overall drag coefficient of the aircraft during cruise. Also, the deflection position of the control surfaces 202 that reduces (e.g., minimizes) drag may vary during flight as conditions (e.g., external conditions) of the aircraft change. Thus, the positions and/or deflection levels of the control surfaces 202 relative to one another may be varied during cruise to maintain an overall drag coefficient of the aircraft. In particular, deflecting the inboard flap 204 and the outboard flap 208 independently of one another may greatly vary the drag coefficient of the aircraft, for example. Additionally, the effect(s) of moving the inboard flap 204 and the outboard flap 208 relative to one another may also greatly vary with operating conditions of the aircraft such as, for example, weight of the aircraft, wing configuration, control surface geometry, etc. In some known examples, flaps, ailerons, and flaperons are positioned at pre-defined angles during cruise based on table lookup data, which does not take into account the current (e.g., instantaneous) operating conditions of the aircraft. Therefore, it is advantageous to position (e.g., deflect, angle, displace, etc.) the control surfaces 202 to reduce (e.g., minimize) drag during flight based on one or more of the numerous instantaneous operating conditions.

The control surfaces 202 of the illustrated example may be independently moved (e.g., deflected) to control the load distribution in different directions over the wing structure 200. Load distribution and/or flight characteristics may be adjusted in a chordwise direction generally indicated by arrows 216. Likewise, load distribution and/or flight characteristics may be adjusted in a spanwise direction generally indicated by arrows 218.

Load distributions over the spanwise direction of the wing structure 200 are illustrated in FIGS. 2B-2D. Turning to FIG. 2B, a load distribution 224 represents a rectangular load. Likewise, a load distribution 226 of FIG. 2C represents a triangular load along the span of the wing structure 200. A load distribution 228 of FIG. 2D represents an elliptical load over the span of the wing structure 200. The load distributions 224, 226, 228 illustrate that control surfaces may significantly alter the load applied across wings via control surfaces. The different load distributions 224, 226, 228 may alter the drag coefficient of the aircraft significantly. Thus, independent control of the control surfaces about both spanwise and chordwise directions of the aircraft to reduce (e.g., minimize) drag coefficient is a multidimensional problem.

Figure 3:
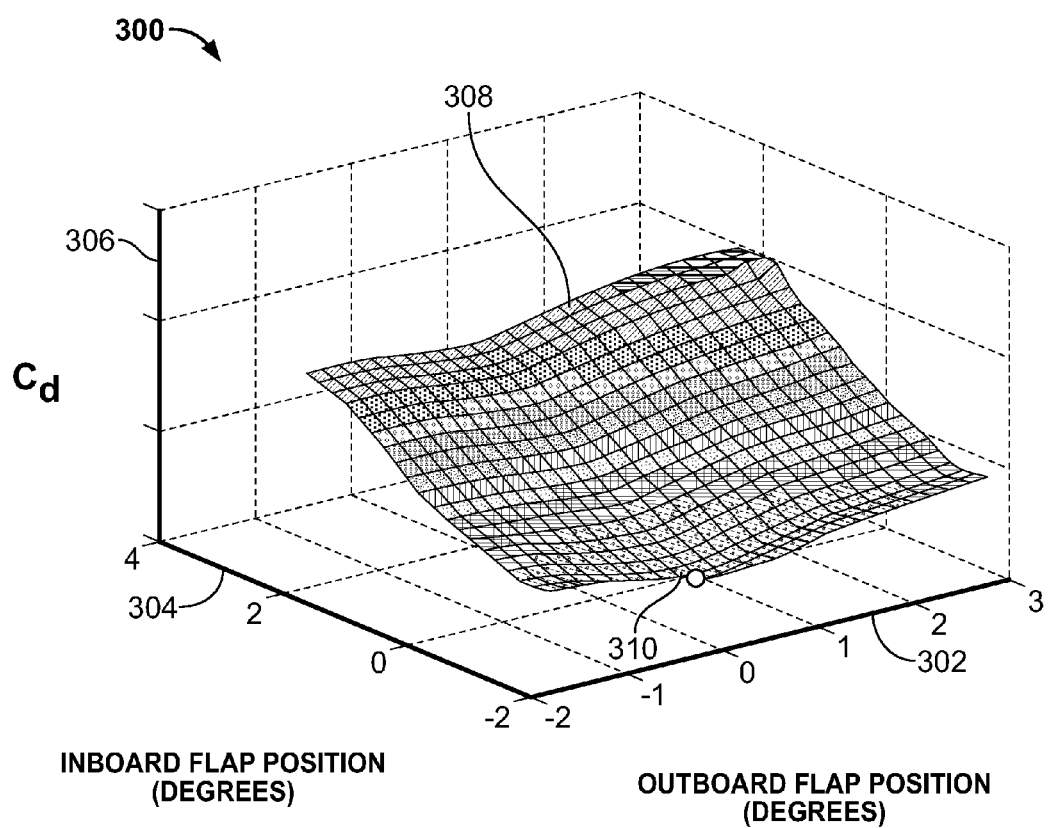
FIG. 3 is a 3-D contour graph depicting drag coefficient relating to positions of flaps.

FIG. 3 is a 3-D contour graph 300 depicting drag coefficient relating to positions of inboard and outboard flaps of an aircraft such as, for example, the inboard flap 204 and the outboard flap 208 described above in connection with FIG. 2A. A first axis 302 of the illustrated example represents various positions of an outboard flap. In this example, the positions are represented by positive and negative angles in units of degrees, which represent positions that may be opposite one another (e.g., angled downward versus angled upward), and zero (e.g., a neutral or horizontal position). Likewise, a second axis 304 of the illustrated example represents the inboard flap positions, which are also represented by positive and negative angles, and zero. In this example, a third axis 306 represents drag coefficient, $c_d$, of the aircraft during cruise at steady-state conditions. A surface contour 308 of the illustrated example represents the variation of drag coefficient for numerous positions of the inboard and outboard flaps. The contour 308 has a lower drag coefficient region depicted by a lower region (e.g., minimum point) 310. Reducing (e.g., minimizing) the drag coefficient is a multidimensional problem because multiple control surfaces being controlled (e.g., deflected) to affect the overall drag coefficient of the aircraft. Therefore, to reduce the overall drag coefficient, numerous possible positions of the multiple control surfaces are considered. In some examples, spanwise and chordwise control of the multiple control surfaces is taken into account as described in connection with FIG. 2. In some examples, one or more of the flaps may be incrementally displaced (e.g., perturbed) from their calculated deflections (e.g., calculated deflections to minimize drag coefficient) and/or steady-state deflections to collect data (e.g., metric data) to calculate predicted deflections and/or deflection deltas that defined the predicted change in displacement to reduce (e.g., minimize) drag coefficient, for example. The estimation and optimization algorithm 404 described below in connection with FIG. 4 seeks to characterize (e.g., define) the resultant drag coefficient (e.g., the shape of a contour such as the contour 308).

Figure 4:
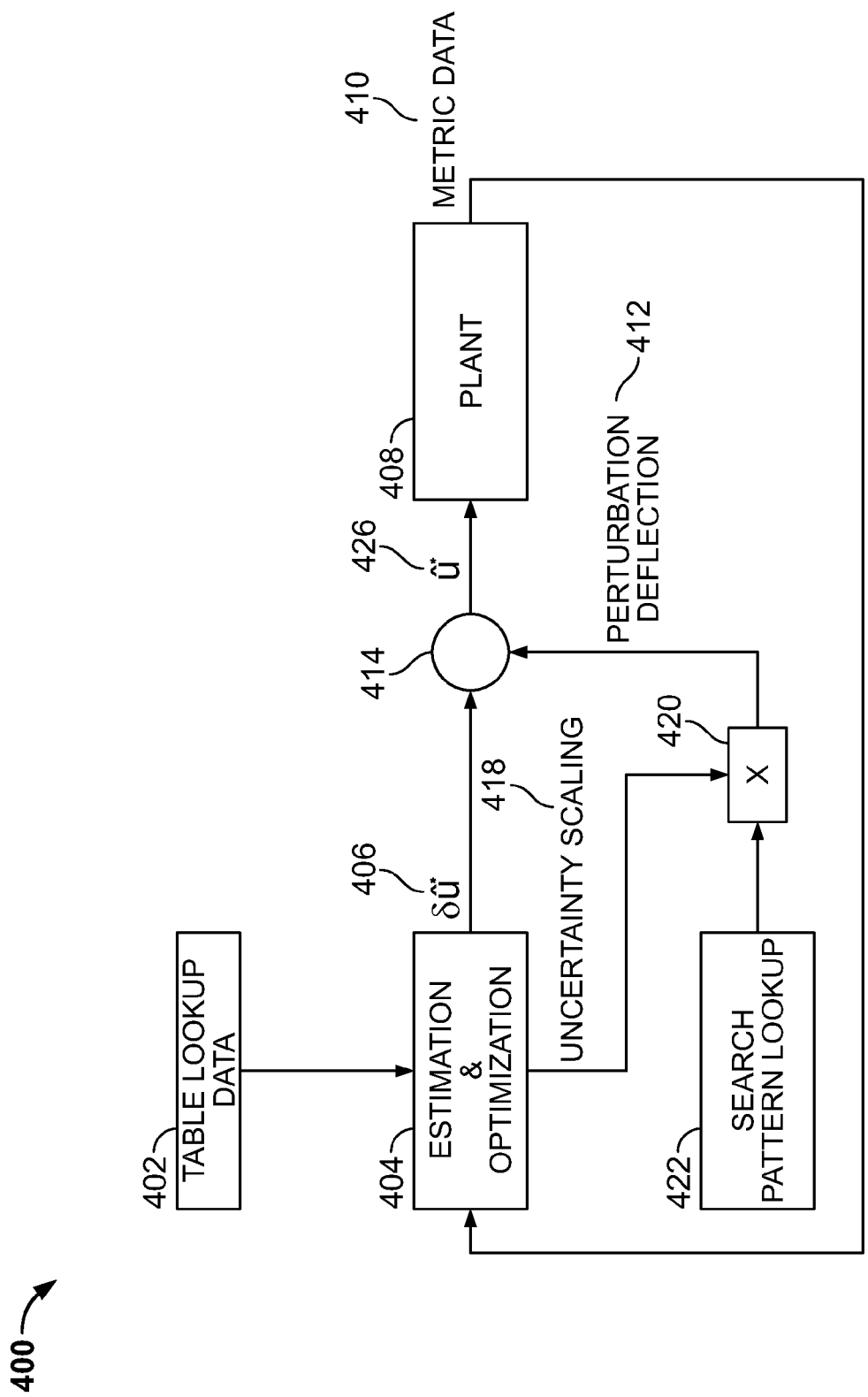
FIG. 4 is a schematic representation of a control system of an aircraft that may be used to implement the examples disclosed herein.

FIG. 4 is a schematic representation of a control system 400 of an aircraft (e.g., the aircraft 100 of FIG. 1) that may be used to implement the examples disclosed herein. In this example, the control system 400 reduces (e.g., minimizes) the drag coefficient of the aircraft by determining (e.g., characterizing) a minimum drag region such as the lower region 310 of the contour 308 described above in connection with FIG. 3 to identify optimal control surface deflections or angles. The control system 400 of the illustrated example incorporates table lookup data 402, which is provided to an estimation and optimization algorithm 404. In this example, the table lookup data 402 includes estimated optimal positions or deflections of a control surface(s). In some examples, the table lookup data 402 includes table data (e.g., reference table data) to provide recommended control surface positions or deflections based on inputs such as velocity (e.g., mach number), altitude, coefficient of lift, aircraft design, configuration of flaps, etc. The estimation and optimization algorithm 404 of the illustrated example utilizes an extended Kalman filter framework to generate a calculated deflection change (e.g., delta) 406 of the control surface and provide the calculated deflection change 406 to a plant 408, which includes the actuators and sensors of the aircraft 401. In particular, the calculated deflection change 406 defines the amount the control surface should be deflected or actuated by an actuator(s). In this example, the estimation and optimization algorithm 404 of the illustrated example receives metric data 410 measured at the plant 408 and/or the table lookup data 402 to estimate the behavior of the metric (e.g., estimates a predicted value of the metric data 410), which may be drag coefficient for example, relative to control surface deflections and/or changes in control surface deflections.

To ensure that sufficient information is available to generate such estimates and/or characterize the behavior of the metric data 410 associated with drag coefficient for example, the control surface, in some examples, is incrementally deflected (e.g., perturbed). In this example, a perturbation deflection (e.g., perturbation, incremental deflection, etc.) 412 is added to the calculated deflection change 406 via a data operation 414 yielding a search pattern centered on a current estimate. In some examples, the Kalman filter framework estimates sensitivity of the metric data 410 (e.g., sensitivity of the metric data 410 to changes and/or perturbations of the control surface) to adjust an uncertainty scaling factor 418 and/or the perturbation deflection 412. In some examples, the estimation and optimization algorithm 404 utilizes a quadratic estimate to calculate deflection change 406 and/or the uncertainty scaling factor 418.

In this example, the estimation and optimization algorithm 404 provides the calculated deflection change 406 to the data operation 414 and the uncertainty scaling factor 418 to a data operation 420. A search pattern lookup 422 of the illustrated example provides a multidimensional search pattern (e.g., search pattern matrix) to the data operation 420, which multiplies the uncertainty scaling factor 418 with the search pattern (e.g., a search pattern matrix) provided from the search pattern lookup 422 resulting in the perturbation deflection 412. The search pattern of the illustrated example can be scaled or disengaged by the estimation and optimization algorithm 404 via the estimated uncertainty scaling factor 418 to decrease (e.g., minimize) or eliminate incremental deflections or perturbations applied to the control surface. In some examples, the perturbation deflection 412 is based on scaled uncertainty levels computed within the estimation process of the estimation and optimization algorithm 404. In particular, scaling can lead to large perturbations when there is a relatively large uncertainty regarding the optimal deflection of the control surface. In multidimensional examples (e.g., multiple flaps), perturbation of each of the control surfaces may be scaled independently of one another (e.g., independent scaling).

As mentioned above, in this example, the perturbation deflection 412 and the calculated deflection change 406 are added (e.g., an addition operation, summed, etc.) at the data operation 414 to provide a resultant deflection 426 to deflect a control surface(s) via the plant 408, which may have numerous actuators to deflect the control surface(s). While a resultant deflection, 426 is provided to the plant 408 in this example, the calculated surface deflection may, alternatively, be provided directly to the plant 408 from the estimation and optimization algorithm 404. The plant 408 of the illustrated example, in turn, provides the metric data 410 to the estimation and optimization algorithm 404 via sensors in the plant 408. In this example, the plant 408 provides the metric data 410 after the aircraft 401 has reached steady-state conditions after deflecting the control surface(s) (e.g., measured after the time necessary for the measured metric to reach a steady-state condition).

The estimation and optimization algorithm 404 of the illustrated example determines and/or reduces a metric value such as, for example, drag coefficient. A minimal value estimation framework of the illustrated example may be demonstrated by the following steps. For example, a calculated u, which may represent a deflection that lowers and/or minimizes drag coefficient (e.g., an optimal deflection), may be computed based on parameter estimates, $\{\hat{Q}_i\}$. A primary assumption is that such a function may be estimated by a quadratic function of a controlled variable such as trailing edge and/or leading-edge surface position(s), for example. A controlled variable, u, may be represented as:

$$f(u) = u^T Q_2 u + Q_1 u + Q_0 \qquad (1),$$

where $u \in \mathbb{R}^m$, $Q_2 \in \mathbb{R}^{m \times m}$, $Q_1 \in \mathbb{R}^{1 \times m}$, $Q_0 \in \mathbb{R}$ and it is assumed that $f_m(u) \in \mathbb{R}^m \to \mathbb{R}$.

Because Equation 1 is quadratic in u, there is a defined calculated value, u*, that pertains to a minimum value of the function and/or drag coefficient, for example, and may be calculated by differentiating Equation 1, which results in Equation 2 below:

$$f'_m(u) = \left. \frac{\partial f_m}{\partial u} \right|_u + 2Q_2 u + Q_1^T \qquad (2)$$

The calculated value of u* may therefore be represented in Equation 3 as:

$$\hat{u}^* = h_{u^*}(\hat{x}) = -\frac{1}{2} \hat{Q}_2^{-1} \hat{Q}_1^T \qquad (3)$$

Equation 4 defines $H_{\tilde{u}*}$ as:

$$H_{\tilde{u}*} = \frac{\partial h_{u*}(\hat{x})}{\partial x}\bigg|_{\hat{x}_k} \quad (4)$$

Given a state estimate covariance, $\Sigma_x$, an approximate estimate of covariance of the minimizing value as shown in Equation 5:

$$\Sigma_{\tilde{u}*} \approx H_{\tilde{u}*} \Sigma_x H_{\tilde{u}*}^T \quad (5)$$

The computation of $H_{\tilde{u}*}$ may be complex due to the term, $Q_2^{-1}$. However, in some examples, the following formula is used to calculate $$\frac{\partial Q_2^{-1}}{\partial x}$$

to compute a desired Jacobian is shown in Equation 6:

$$\frac{\partial (X^{-1})_{kl}}{\partial X_{ij}} = (X^{-1})_{ki}(X^{-1})_{jl} \quad (6)$$

The relationships described above demonstrate an example in which the extended Kalman filter may be implemented. Such examples may use matrices to characterize the behavior of the systems (e.g., characterize metric behavior related to changes in control surface deflection). While an extended Kalman filter is shown, any other mathematical relationship, equations, etc. may be used to estimate control surface deflections based on metric data, for example.

The degree to which the table lookup data 402 is applied to the estimation and optimization algorithm 404 may be varied. In examples where the table lookup data 402 is not applied, the estimation and optimization algorithm 404 relies primarily on the metric data measurement(s) 410 provided from the plant 408. In other examples, the table lookup data 402 is applied to a large extent to the estimation and optimization algorithm 404 to minimize control surface perturbations. In other examples, the table lookup data 402 is used in a balanced approach for relatively reduced perturbation requirements. In some examples, only the table lookup data 402 is applied using tabulated data to directly update the resultant deflection 426. In other examples, the degree to which the table lookup data 402 is applied may be changed by synthetic measurement updating, in which the Kalman filter framework allows uncertainty in the table derived values to be incorporated in the update of the estimator state. In particular, the steps of such a process include performing a Kalman update of the states assuming direct measurement of the metric function parameters and sampling the metric at the current location to correct any biasing that developed during the update process. In some examples, incorporating the table lookup data 402 improves tabulated data and/or health monitoring of the control system 400.

In some examples, the estimation and optimization algorithm 404 may update the table lookup data 402 based on the characterized behavior of the metric. In other words, the estimation and optimization algorithm may introduce incremental changes to the recommended control surface position(s) of the table lookup data 402 based on determined behavior of the metric and/or data measured at the plant 408 during flight. In particular, stored control surface position data of the table lookup data 402 may be updated to reflect updates based on specific metric behavior data of an aircraft that travels a particular trajectory regularly, for example.

In some examples, process noise parameters may be introduced to the estimation and optimization algorithm 404 to model random disturbances applied to the state dynamics. In some examples, the estimation and optimization algorithm 404 detects changes and/or certain behavior (e.g., divergence from predicted behavior, significant change, etc.) of the metric data 410 and re-engages the search pattern lookup 422 to confirm or update the calculated deflection 406 and/or the resultant deflection 426. In some examples, the estimation and optimization algorithm 404 selects a search pattern based on metric behavior and/or metric behavior changes. In some examples, the estimation and optimization algorithm 404 ignores the metric data 410 if the metric data 410 is considered invalid by, for example, applying a statistical test such as a $\chi$-squared (chi-squared) test.

Figure 5:
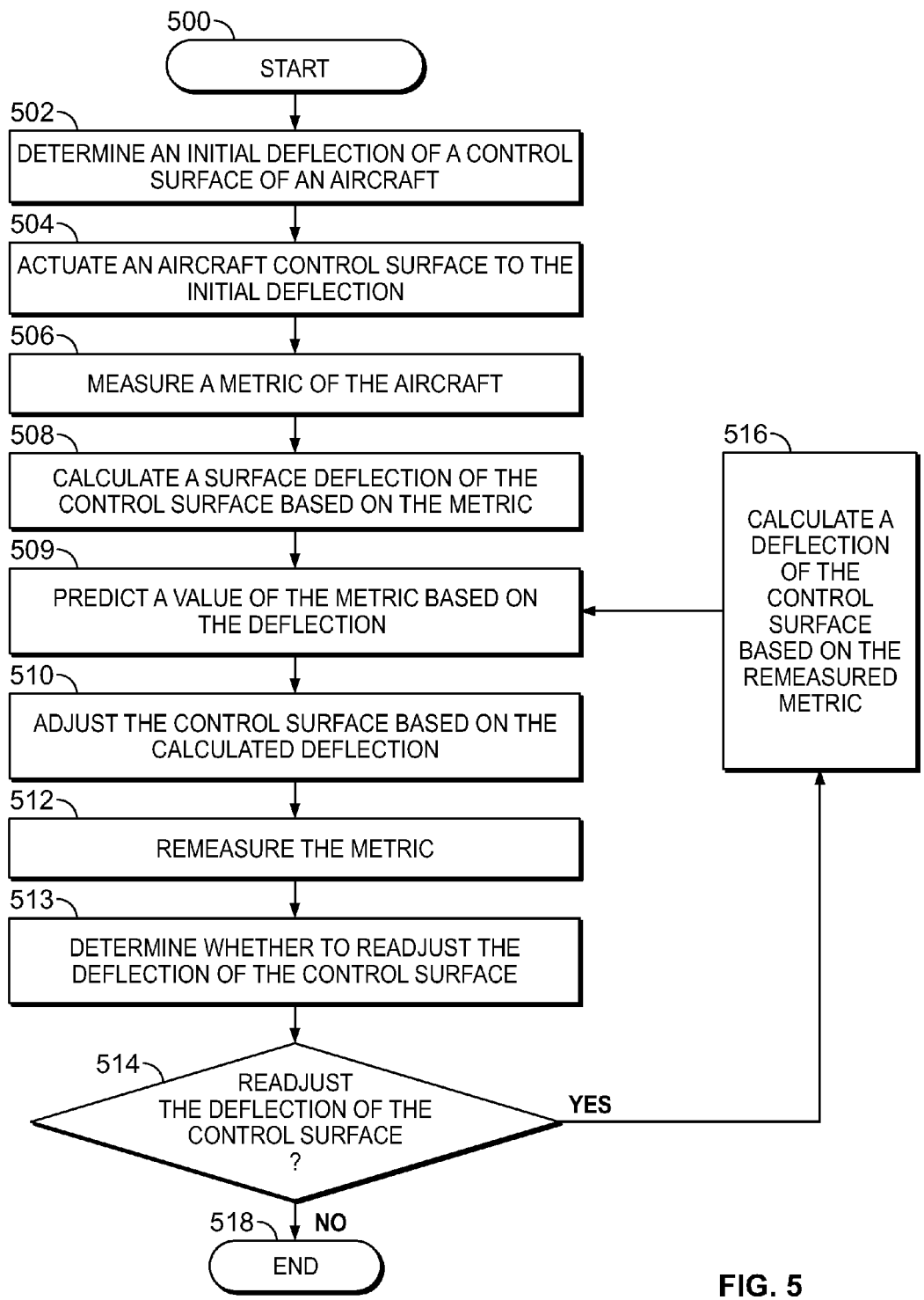
FIG. 5 is a flowchart representative of an example method that may be used to implement the control system of FIG. 4.
Figure 6:
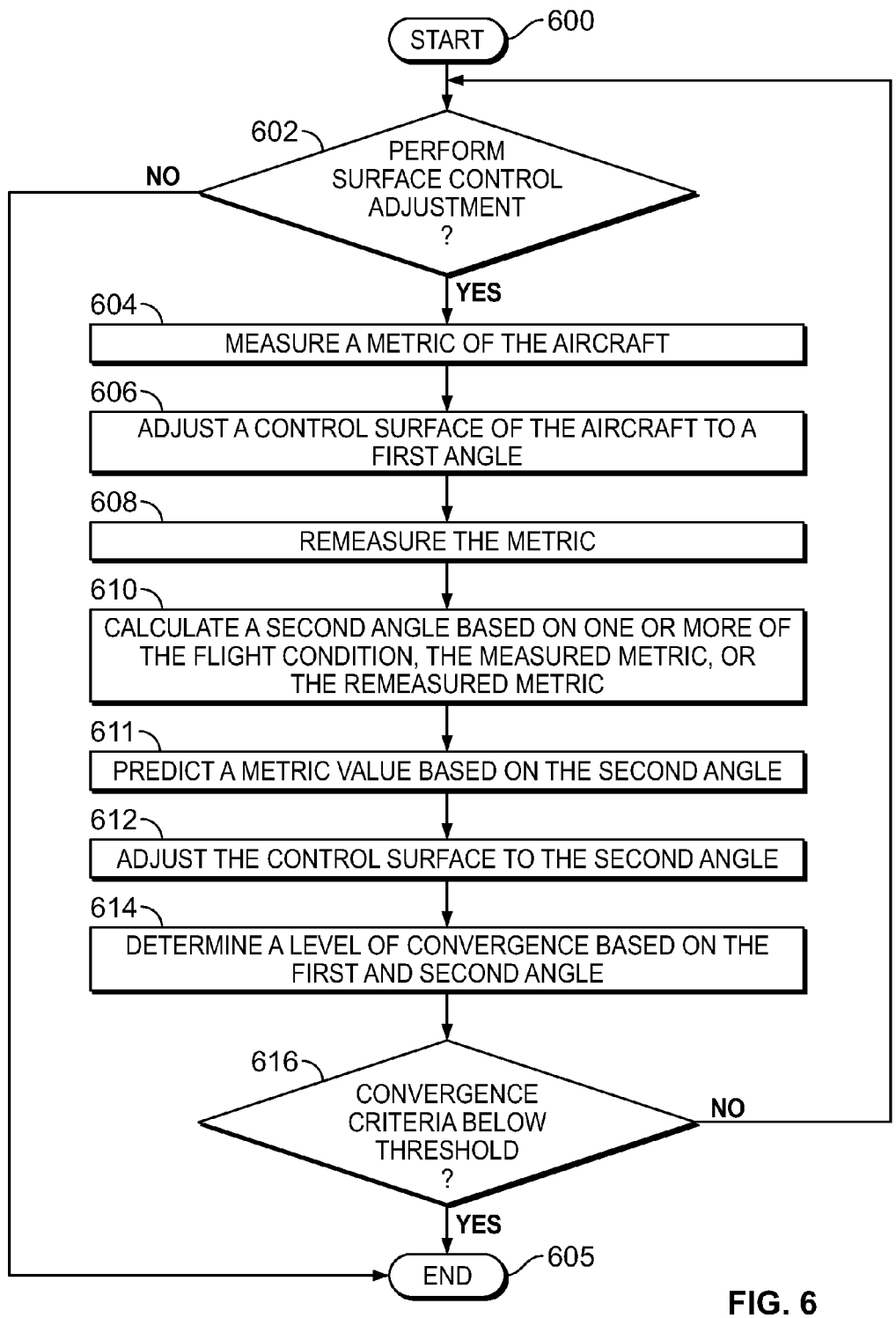
FIG. 6 is a flowchart representative of another example method that may be used to implement the control system of FIG. 4.

Flowcharts representative of example methods for implementing the control system 400 of FIG. 4 are shown in FIGS. 5 and 6. In these examples, the methods may be implemented using machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example control system 400 may alternatively be used. For example, the order of execution of the blocks may be changed, and/or some of the blocks described may be changed, eliminated, or combined.

As mentioned above, the example methods of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 is a flowchart representative of an example method that may be used to implement the control system 400 of FIG. 4. The example method of FIG. 5 begins at block 500 where an aircraft has taken off and has reached cruising speed (block 500). An initial deflection of a control surface of the aircraft is determined (block 502). The initial deflection may be determined by table lookup data such as the table lookup data 402 described above in connection with FIG. 4. In some examples, the initial deflection is a predefined default position. The aircraft control surface is then actuated (e.g., adjusted, deflected, etc.) to the determined initial deflection (block 504). Next, a metric such as the metric data 410, for example, of the aircraft is measured (block 506). The metric may be a drag coefficient, thrust settings, a trim thrust value, percent throttle value or any other appropriate metric. A deflection of the control surface is then calculated based on the metric data and, in some examples, table lookup data such as the table lookup data 402, for example. Such a calculation may use Equations 1-6 described above in connection with FIG. 4. The deflection of the illustrated example is calculated using a search pattern lookup (e.g., the search pattern lookup 422) along with uncertainty scaling (e.g., the uncertainty scaling factor 418) to define a perturbation deflection (e.g., incremental deflection) such as the perturbation deflection 412, for example. This perturbation deflection (e.g., perturbation), in some examples, is then added to the calculated deflection (e.g., the calculated deflection 406) yielding the resultant deflection (e.g., the resultant deflection 426) (block 508). The resultant deflection of the illustrated example is an effective deflection for which the drag coefficient of the aircraft is reduced (e.g., minimized). In some examples, such calculations are accomplished through manipulation of matrices representing multidimensional data (e.g., predictions based on multiple flaps and corresponding multiple flap deflections) and/or search pattern matrices. As mentioned above, the degree to which table lookup data is applied may be varied. Additionally or alternatively, the uncertainty scaling 418 may be varied based on patterns or shifts of the metric data, for example. In some examples, a corresponding metric is predicted based on the calculated surface deflection (block 509).

Next, the control surface is moved (e.g., deflected, actuated, etc.) to the calculated deflection (e.g., effective deflection, displacement, etc.) (block 510). In this example, the metric is then re-measured after the control surface has been adjusted (block 512). In some examples, the metric is not re-measured until the aircraft has reached steady state conditions. After the metric is re-measured, it is determined whether the control surface should be readjusted (block 513) by the estimation and optimization algorithm 404, for example. Such a determination may be based on convergence criteria (e.g., a calculated deflection only varies by a small degree to the previously calculated deflection of a previous iteration). In some examples, the control surface may have a time limitation to be adjusted (e.g., the control surface is only adjusted for a time period after the aircraft has reached cruising speed). In some examples, this determination may be accomplished by the calculated narrowing of the determined error band (e.g., a narrowing of an error band surrounding an estimate in the estimation and optimization algorithm 404, for example. If it is determined that the control surface is to be readjusted (block 514), another surface deflection of the control surface is calculated based on the re-measured metric (block 516), table lookup data, and/or metric data obtained from deflection of the control surfaces, and, thus, a corresponding predicted metric value is predicted (block 509) and the control surface is adjusted to that calculated surface deflection (block 510). In contrast, if it is determined that the control surface is not to be adjusted (block 514), the process ends (block 518).

FIG. 6 is another flowchart representative of another example method that may be used to implement the control system 400 of FIG. 4. The example method of FIG. 6 begins at block 600 where an aircraft has taken off and has reached cruising speed (block 600). Next, it is determined whether a control surface adjustment should be performed (block 602). Such a determination may occur in response to a threshold time being exceeded after the aircraft has reached cruising speeds, for example. In other examples, this determination results from monitoring flight parameters and/or control systems determining that steady state conditions have been reached. In yet other examples, this determination may occur through convergence of a measured flight metric and/or calculated deflection(s). If it is determined that control surface adjustment is to be performed (block 602), a metric is measured (block 604). Conversely, if control surface adjustment is not to be performed (block 602), the process ends (block 605). If control surface adjustment is to be performed, a control surface is moved to a first angle (block 606), which, in some examples, is determined from table lookup data such as the table lookup data 402 described above in connection with FIG. 4. In some examples, the first angle may be defined by table lookup data, a search pattern lookup and/or metric data.

The metric is then re-measured (block 608), which may occur after the aircraft has achieved steady state conditions with the control surface being at the first angle. A second angle is then calculated based on one or more of the flight condition, the measured metric, or the re-measured metric (block 610). Such a calculation may use the estimation and optimization algorithm 404 and/or Equations (1)-(4) described above in connection with FIG. 4, for example. In some examples, a metric value based on the second angle is predicted (block 611). The control surface is then adjusted to the second calculated angle (block 612). Next, a convergence level such as the degree to which the first and second angles have converged, for example, is determined (block 614). If the convergence level is above a threshold (block 616), the process ends (block 605). If the convergence level is below a threshold (block 616), the process repeats (block 605).

Figure 7:
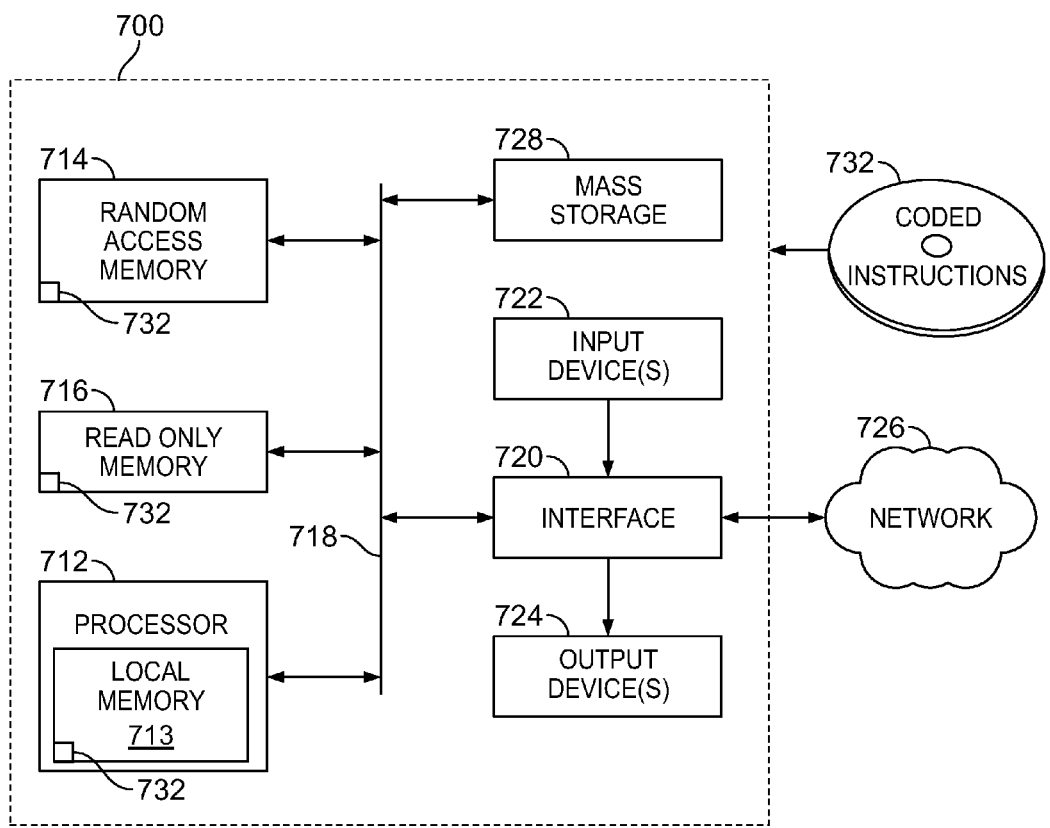
FIG. 7 is a block diagram of an example processor platform capable of executing machine readable instructions to implement the example methods of FIGS. 5 and 6.

FIG. 7 is a block diagram of an example processor platform 700 capable of executing instructions to implement the methods of FIGS. 5 and 6 to implement the example control system 400 of FIG. 4. The processor platform 700 can be, for example, a server, a personal computer, a mobile device (e.g., a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory including the volatile memory 714 and the non-volatile memory 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the methods of FIGS. 5 and 6 may be stored in the mass storage device 728, in the volatile memory 714, in the non-volatile memory 716, and/or on a removable tangible computer readable storage medium such as a CD or DVD.

Figure 8:
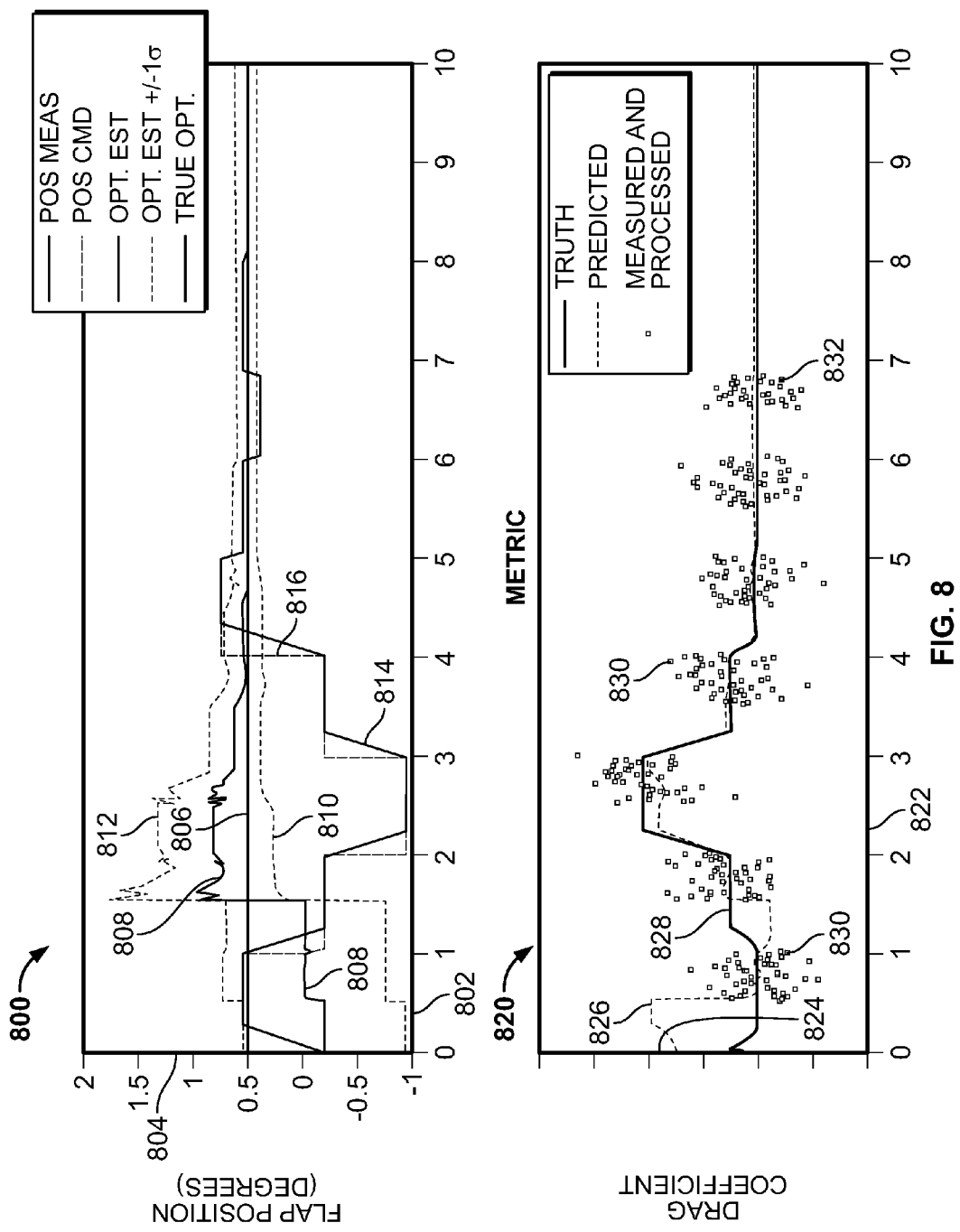
FIG. 8 represents example time-history plots of flap positions and drag coefficient of an aircraft with respect to time using the examples disclosed herein.

FIG. 8 represents example time-history plots of a flap position of a flap and drag coefficient of an aircraft with respect to time using the examples disclosed herein. In this example, a first plot 800 represents flap position as a function of time. The first plot 800 of the illustrated example includes a horizontal axis 802, which represents time as a unitless parameter, and a vertical axis 804, which represents a flap position measured in degrees. An optimal line 806 of the illustrated example represents a theoretical optimum flap position at steady-state conditions (e.g., a flap position corresponding to the lowest drag coefficient of the aircraft). In this example, an estimation line 808 represents the estimated optimal flap position (e.g., the calculated deflection estimate to minimize the drag coefficient) as calculated by an algorithm such as the estimation and optimization algorithm 404 described above in connection with FIG. 4, for example. The dotted lines 810 and 812 represent lower and upper error estimates, respectively, of the estimation line 808. The dotted lines 810 and 812 may be determined by an algorithm such as, for example, the estimation and optimization algorithm 404. In this example, a positional line 814 represents the actual position of the flap. The positional line 814 of the illustrated example starts at a neutral position at the initial time (i.e., t=0). In this example, a command line 816 represents the flap set point (e.g., command set point) determined by the estimation and optimization algorithm 404, for example. As shown in the first plot 800, as time progresses, the estimation line 808 converges towards the optimal line 806. Additionally, the dotted lines 810 and 812 both converge towards the optimal line 806 (e.g., the error band becomes tighter around the estimation line 808). As time progresses, the shifts of the positional line 814 of the flap decreased about the optimal line 806 as shown by the smaller positional displacements further in time (e.g., the perturbation deflections or perturbations decrease).

A second plot 820 of the illustrated example represents drag coefficient of the aircraft as a function of time. Like the horizontal axis 802 of the first plot 800, a horizontal axis 822 also represents time as a unitless measurement. A vertical axis 824 of the illustrated example represents drag coefficient. In this example, a predicted line 826 represents the predicted minimal (e.g., optimal) drag coefficient from an algorithm such as the estimation and optimization algorithm 404 described above in connection with FIG. 4. A truth line 828 of the illustrated example represents a theoretical minimum drag coefficient based on flap position. Scattered points 830 represent actual measured drag coefficient data points. Such scattering may occur from noise in measurements, oscillations, etc. In this example, as time progresses, the predicted line 826 and the truth line 828 converge indicating that the drag coefficient of the algorithm eventually converges to a theoretical prediction. Later scattered points 832 demonstrate that the noise of the drag coefficient measurements continues even though the predicted line 826 and the truth line 828 have converged. The second plot 820 represents how robustly the examples disclosed herein can sort through and/or filter noise in measurements to determine the lowest drag coefficient value and/or region such as the lower region 310 described above in connection with FIG. 3.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example apparatus may be applied to vehicles, aerodynamic structures, etc. While the examples described have been primarily related to an aircraft during cruise, the examples may be applied to takeoff or any other appropriate stage pertaining to the aircraft.

What is claimed is:

1. A method comprising:
   measuring a flight metric of an aircraft during cruise of the aircraft;
   calculating, using a processor, a first deflection based on the measured flight metric;
   inducing a perturbation deflection of a control surface based on the calculated first deflection;
   re-measuring the flight metric of the aircraft in response to the induced perturbation deflection to gather data about a drag coefficient pertaining to the aircraft during cruise;

calculating, using the processor, a second deflection of the control surface of the aircraft based on the re-measured flight metric by adding a perturbation estimate increment to a deflection estimate that reduces drag; and adjusting the control surface to the second deflection to reduce the drag coefficient of the aircraft during cruise.

2. The method as defined in claim 1, wherein adjusting the control surface comprises adjusting a wing camber.

3. The method as defined in claim 1, wherein the flight metric comprises an amount of thrust.

4. The method as defined in claim 1, wherein calculating at least one of the first and second deflections comprises using a Kalman-filter based method to estimate a sensitivity of the flight metric.

5. The method as defined in claim 1, wherein calculating at least one of the first and second deflections comprises using a drag value, a trim thrust value, or a percent throttle value.

6. A method comprising:
measuring a flight metric of an aircraft during cruise of the aircraft;
inducing a perturbation deflection of a control surface of the aircraft to a first angle based on the measured flight metric;
re-measuring the flight metric in response to the induced perturbation deflection to gather data about a drag coefficient pertaining to the aircraft during cruise;
calculating, using a processor, a second angle of the control surface based on the re-measured flight metric and one or more of a flight condition, or the measured flight metric, wherein the second angle includes an adjustment angle to reduce the drag coefficient of the aircraft during cruise; and
adjusting the control surface to the second angle.

7. The method as defined in claim 6, wherein the flight metric comprises an amount of thrust.

8. The method as defined in claim 6 wherein at least one of adjusting the first angle or the second angle comprises adjusting a wing camber.

9. The method as defined in claim 6, wherein calculating the second angle comprises using a Kalman-filter based method to estimate a sensitivity of the flight metric.

10. The method as defined in claim 6, wherein calculating the second angle comprises estimating drag in response to a deflection of the control surface.

11. The method as defined in claim 6, wherein calculating the second angle comprises using one or more of a drag value, a trim thrust value, table lookup data or a percent throttle value.

12. The method as defined in claim 6, wherein calculating the second angle is further based on table lookup data.

13. A method comprising:
adjusting an aircraft control surface to a first angle during cruise of the aircraft;
measuring a flight metric after the aircraft reaches steady state during cruise;
calculating, using a processor, a deflection of the aircraft control surface based on the measured flight metric;
inducing a perturbation deflection of the aircraft control surface based on the calculated deflection;
re-measuring the flight metric in response to the induced perturbation deflection to gather data about a drag coefficient pertaining to the aircraft during cruise;
calculating, using the processor, a second angle of the aircraft control surface based on the re-measured flight metric to reduce the drag coefficient of the aircraft during cruise, wherein the second angle includes an adjustment angle; and
adjusting the aircraft control surface to the second angle.

14. The method as defined in claim 13, further comprising calculating a level of convergence between the first angle and the second angle to determine whether to readjust the aircraft control surface.

15. The method as defined in claim 13, wherein the first angle is determined from table lookup data.

16. The method as defined in claim 13, wherein calculating the second angle comprises adding the perturbation deflection to a deflection estimate that reduces drag.

17. The method as defined in claim 13, wherein calculating the second angle comprises using a quadratic estimate.

18. The method as defined in claim 13, wherein calculating the second angle is further based on table lookup data.

19. The method as defined in claim 12, wherein the table lookup data is updated based on at least one of the measured flight metric or the re-measured flight metric.

20. The method as defined in claim 18, wherein the table lookup data is updated based on the measured flight metric.

21. The method as defined in claim 6, wherein the control surface includes a first control surface and further including perturbing a second control surface to a second perturbation deflection based on a scaling factor that relates a first degree of perturbation of the second control surface to a second degree of perturbation of the first control surface.

22. The method as defined in claim 4, wherein the Kalman-filter based method is used to adjust at least one of an uncertainty scaling factor or the perturbation deflection.

23. The method as defined in claim 9, wherein the Kalman-filter based method is used to adjust at least one of an uncertainty scaling factor or the first angle.

24. The method as defined in claim 13, wherein calculating the second angle includes using a Kalman-filter based method to estimate a sensitivity of the flight metric.

25. The method as defined in claim 24, wherein the Kalman-filter method is used to adjust at least one of an uncertainty scaling factor or the first angle.

26. The method as defined in claim 1, wherein the first deflection is calculated further based on an uncertainty scaling factor.

27. The method as defined in claim 6, wherein a degree of the induced perturbation of the control surface of the aircraft to the first angle is further calculated based on an uncertainty scaling factor.

28. The method as defined in claim 13, wherein the calculated deflection of the aircraft control surface is calculated further based on an uncertainty scaling factor.

* * * * *

UNITED STATES PATENT AND TRADEMARK OFFICE
CERTIFICATE OF CORRECTION

| | |
|---|---|
| PATENT NO. | : 9,821,903 B2 |
| APPLICATION NO. | : 14/330824 |
| DATED | : November 21, 2017 |
| INVENTOR(S) | : Abraham J. Pachikara et al. |

It is certified that error appears in the above-identified patent and that said Letters Patent is hereby corrected as shown below:

In the Claims

Column 14, Line 56-57 (Claim 28), after the word "is;" remove the word --calculated--.

Signed and Sealed this
Twenty-ninth Day of May, 2018

Andrei Iancu
*Director of the United States Patent and Trademark Office*